Jan. 16, 1973 J. PUGH 3,711,369
CHARGE/DISCHARGE ARRANGEMENTS FOR NUCLEAR REACTOR
Filed Dec. 23, 1969 7 Sheets-Sheet 7
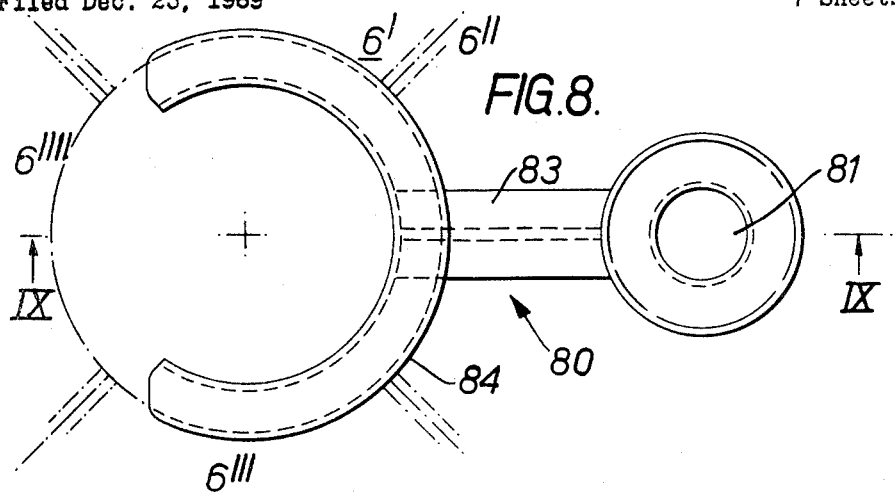
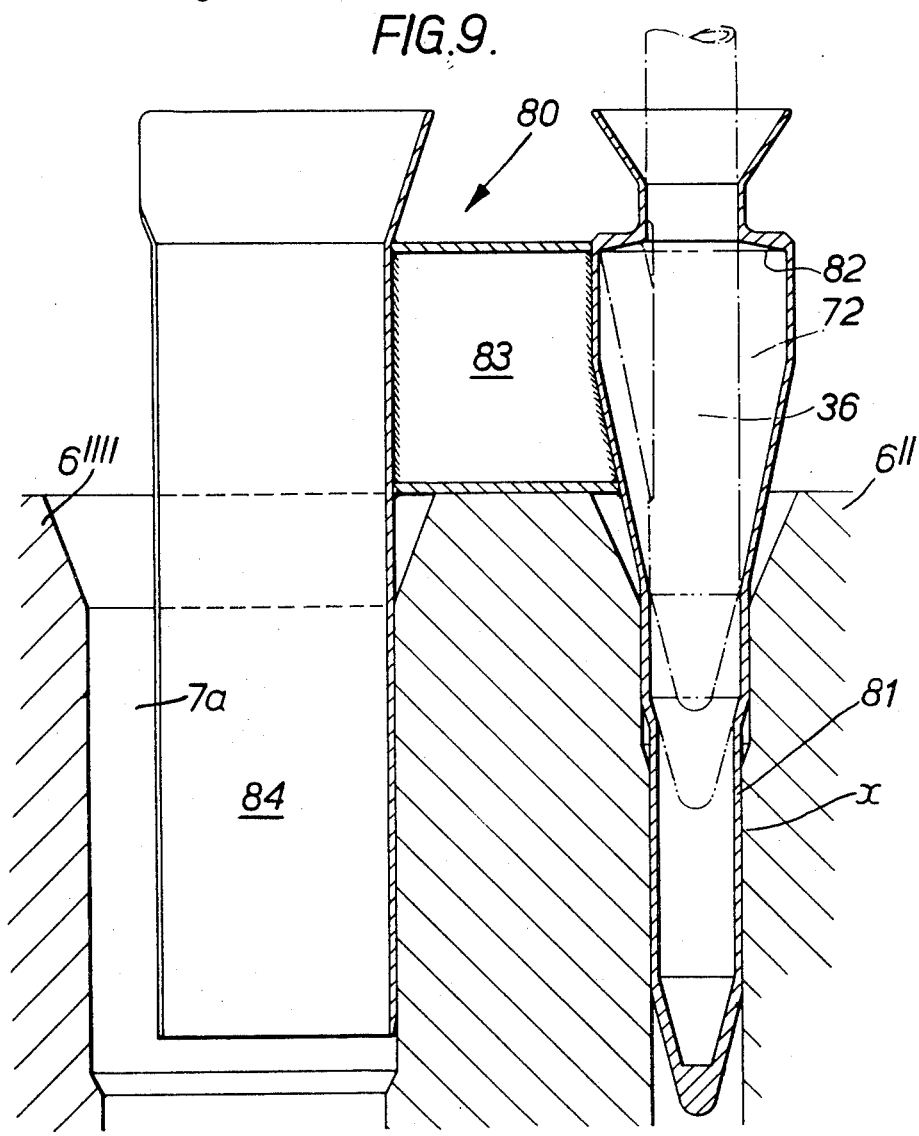

United States Patent Office 3,711,369
Patented Jan. 16, 1973

3,711,369
CHARGE/DISCHARGE ARRANGEMENTS FOR NUCLEAR REACTOR
John Pugh, Winfrith, England, assignor to United Kingdom Atomic Energy Authority, London, England
Filed Dec. 23, 1969, Ser. No. 887,668
Int. Cl. G21c 19/20, 5/08
U.S. Cl. 176—30                                              7 Claims

ABSTRACT OF THE DISCLOSURE

A gas cooled nuclear reactor has its core composed of columns of blocks of moderator material which incorporate the nuclear fuel; fuel and moderator being recharged as a unit. According to this arrangement there are a number of longitudinal plugs which are located between adjacent groups of columns which fix the inter-column clearance during core operation so as to ensure a stable assembly. For refueling one of the plugs is withdrawn and an adjacent block may then be removed but a keeper is inserted to hold back blocks neighbouring the void so created, and to keep other blocks from being displaced into the void. The keeper may either be a part of the charge machinery or a separate component.

BACKGROUND OF THE INVENTION

This invention relates to gas cooled nuclear reactors of a construction which facilitates the refueling operation and also relates to refuelling systems for such reactors where the fuel is arranged as a cluster of fuel bearing moderator blocks lying beneath a common access point central to the cluster. One example of a reactor core fuelled in this manner is mentioned in the commonly owned copending Rennie et al. U.S. patent application No. 782,295 filed on Dec. 9, 1968 wherein the fuel is incorporated in a number of pentagonal blocks of moderator material arranged in free standing columns. Such an arrangement is adaptable for the refuelling of the core, by use of the invention described herein whereby a single component which incorporates both some fuel and its moderator is replaceable as a unit.

During this operation which amounts to the temporary removal of part of the core structure which must be done by tools which operate in the core under remote control, there is a risk that one of the adjacent fuelled moderator blocks may tumble into the vacated space.

SUMMARY OF THE INVENTION

According to the invention a refuelling system for a nuclear reactor whose core comprises a plurality of juxtaposed blocks of moderator material which carry nuclear fuel comprises the steps of removing one block, inserting a keeper in the core to retain some of the blocks adjacent the space vacated by the removed block, the keeper allowing removal of other of the blocks to proceed.

In one form the keeper is provided by a tubular portion of the charge discharge tool and acts as a centre with respect to which the lifting tool grapple is moved. In an alternative form the keeper is a separate member, easily manipulable by the charge machine grapple.

Conveniently in one form, the reactor core is made up from a number of columns of superimposed blocks of moderator bearing nuclear fuel, the columns being provided with clearance on adjacent flanks but held in partial interlocking relationship by longitudinal plugs which urge adjacent blocks to take up or fix said clearance whilst the core is operative, the arrangement being such that the clearance can be reinstated by creating slack locally prior to fuel block replacement by removal of a longitudinal plug by a charge machine. The charge machine has the facility for discharging a column of blocks from the top of the column.

The fuel charge machine which may be adapted for "on-load" refuelling of the core, comprises a small mobile pressure container manoeuvreable over the top of the pressure vessel standpipes which afford access points to the underlying core. The container houses the necessary plug removal and fuel block-removal tools, the fuel block removal tool comprising a gripper means for entering the fuel block handling hole and keeper for entry to the hole vacated by the plug so as to centre the gripper correctly with respect to a hole in the fuel block. However, the present system is also characterised in that longitudinal plugs, inserted to take up working clearance between adjacent columns of blocks, are first removed and the holes vacated by them, which lie directly beneath the access points are employed to receive the keeper to help in centering the fuel block grapple but mainly to restrain displacement of the fuel blocks bordering the hole created by removal of the block as will be more fully explained below.

The reactor core itself is of course a rigid structure with the longitudinal plugs in position.

According to the present invention there is provided a nuclear reactor core structure of a construction which facilitates the refuelling operation and composed of a number of columns disposed side by to form a substantially contiguous core and each column comprising at least one fuel bearing block, a peripheral member bounding the core:

(i) the columns being arranged in a number of groups;
(ii) the blocks of each group being disposed about a common axis extending centrally of the group and parallel to the side faces of the columns;
(iii) a clearance fixing plug disposed on said axis of at least some of said groups and engaging a portion of the outer surface of each of the columns in that group;
(iv) the said plug serving to urge the blocks which it engages away from said axis so that the peripheral surfaces of that group engages the peripheral surface of adjacent groups, whilst fixing a predetermined clearance between adjacent faces of blocks of that group, Control rod thimbles may be disposed at positions between the peripheral surfaces of neighbouring groups.

DESCRIPTION OF THE DRAWINGS

In order that the invention may be better understood one embodiment thereof will now be described with reference to the accompanying drawings in which:

FIG. 5 is a sectional elevation of the core block handling assembly;

FIG. 6 is a sectional elevation showing the assembly of FIG. 4 with the plug lifting gear interengaged;

FIGS. 8 and 9 show respectively an alternative form of keeper, FIG. 8 being a plan view and FIG. 9 being a cross section on the lines IX—IX of FIG. 8.

DESCRIPTION OF THE PREFERRED EMBODIMENT

Figure 1:
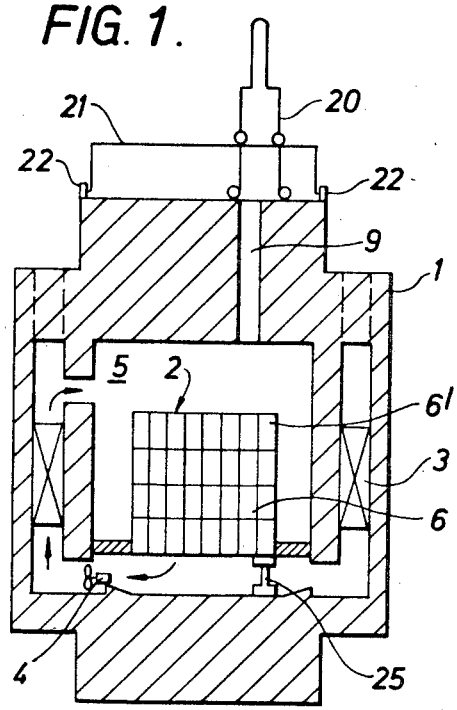
FIG. 1 is a diagram of a gas cooled nuclear reactor with its fuel charging machine.

Referring firstly to FIGS. 1–4, a gas cooled nuclear reactor having a concrete pressure vessel 1 enclosing a reactor core 2 has a primary gas circuit for cooling the core and transferring the heat generated therein to heat exchangers 3. Gas circulators 4 are situated in cavities in the pressure vessel walls which also contain the heat exchangers 3 and are operated to draw hot gas downwardly through core coolant channels and upwardly through the heat exchangers whence the cooled gas is reintroduced into the cool gas plenum chamber 5 above the core. The chamber 5 affords comparatively cool regions within which refueling devices may be introduced and operated as well as neutron control rod mechanisms.

Figure 2:
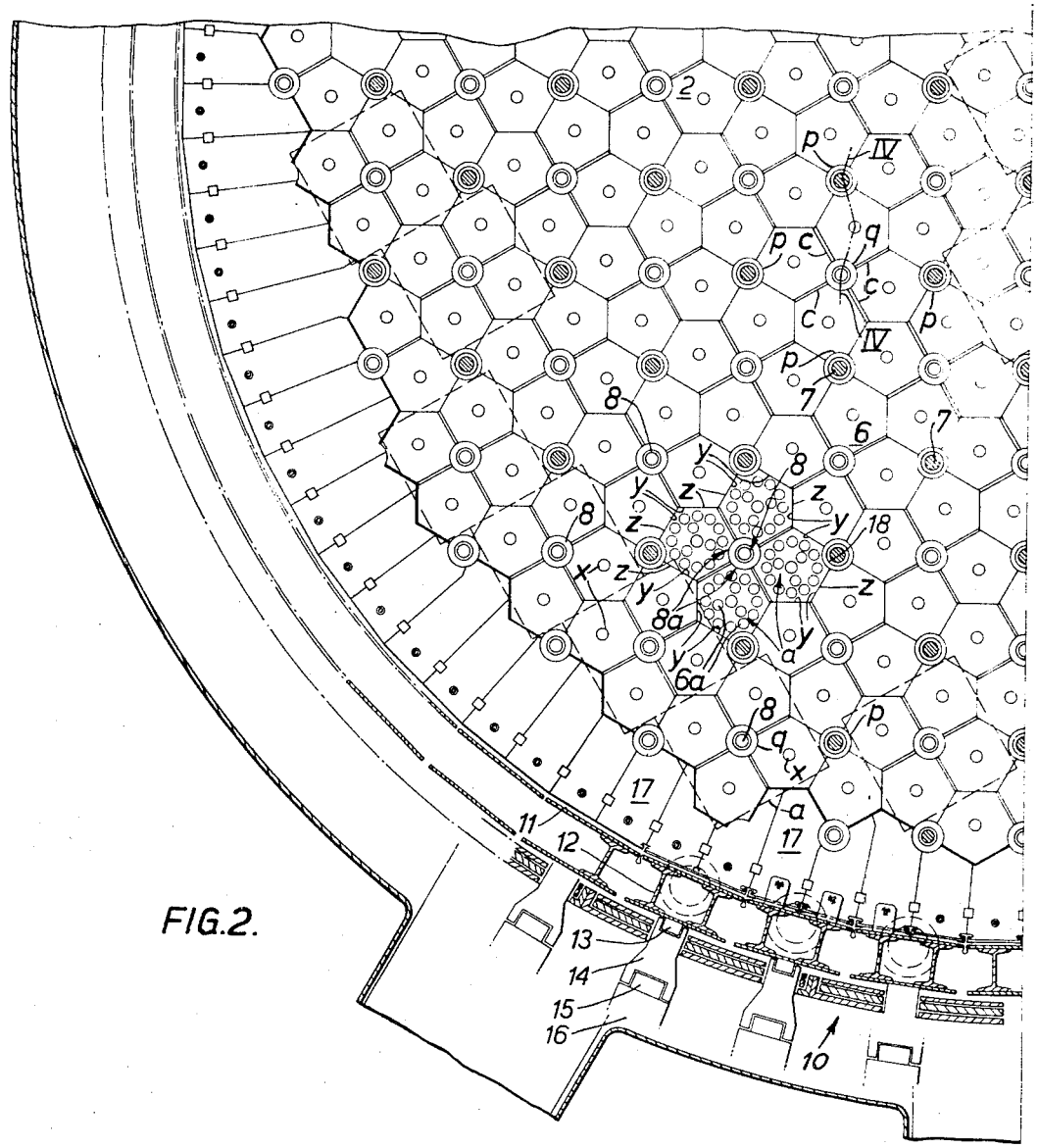
FIG. 2 is a plan view of one quarter of a nuclear reactor core.
Figure 3:
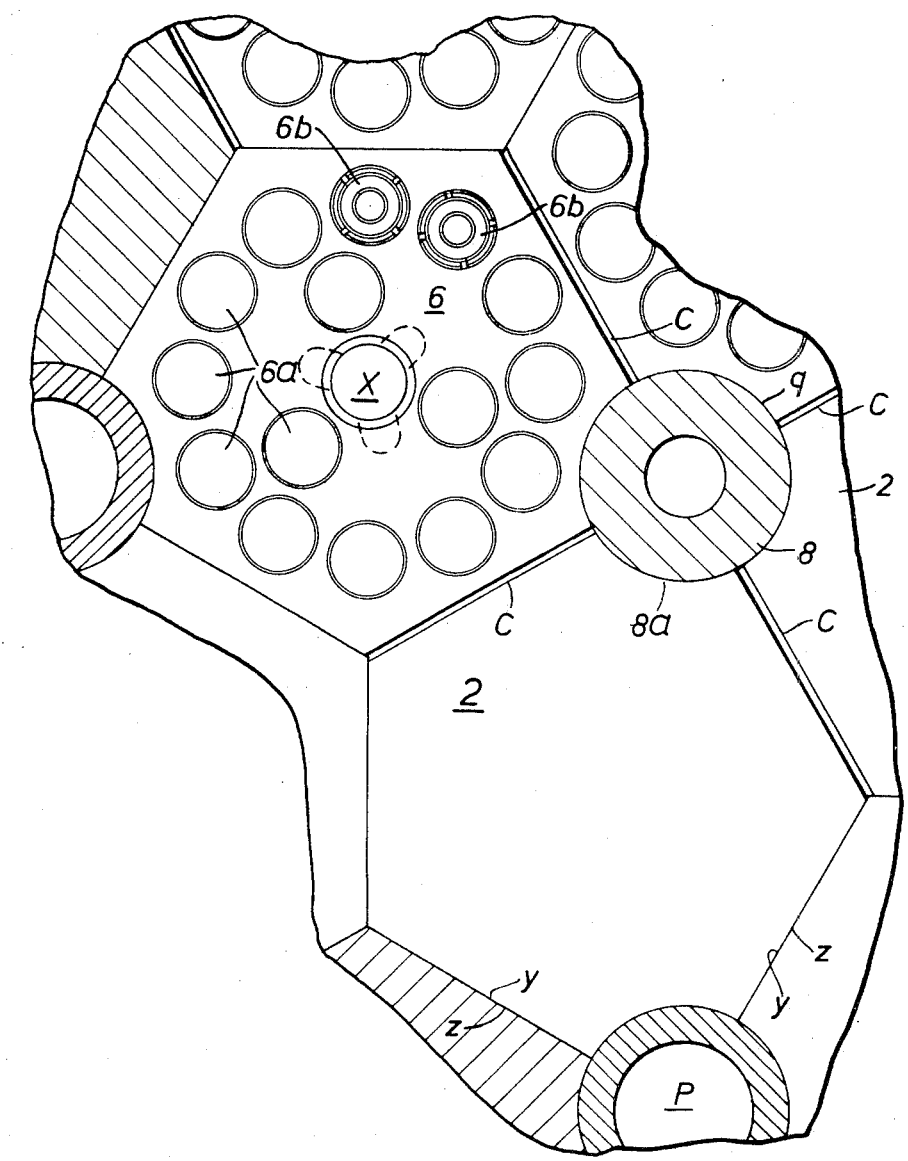
FIG. 3 is a view of part of FIG. 2 shown to an enlarged scale.

To this end, fuel handling and control rod positions are suitably distributed across the core cross-section and this is facilitated by forming the core from vertical columns of blocks 6, pentagonal in cross-section as indicated in FIG. 2A. The blocks are formed with coolant holes $6a$ in which are supported annular fuel bodies $6b$, cooling holes in the blocks coinciding axially so as to form coolant channels which penetrate the whole column. The fuel which may be of low enrichment (5% U235) is thus dispersed in discrete regions across the core. At the centre of each block is a hole $x$ for the reception of a fuel block lifting rod. At two opposite corner positions of the blocks where four corners would normally meet, grooves are formed and these co-operate to define circular section holes $p$, $q$, the centres of which fall on a square lattice as shown in FIG. 2. Holes designated $p$ for the reception of control absorber rods 7 and holes (designated $q$) for the reception of plugs 8. The holes $q$ lie directly beneath penetration 9 in the pressure top cap as also do control rod holes $p$. The columns of blocks are arranged in groups of four, the columns of each group being disposed about a common vertical axis extending centrally. One such group is designated by the small case letter $a$ in FIG. 2. A longitudinal plug 8 is disposed on the axis of at least some of the groups and in this plug engages a portion $8a$ of the outer surface of each of the columns of that group. In the arrangement shown there are four columns each of substantially pentagonal prismatic blocks 6 in each group and the portions $8a$ are arcuate so that four such arcuate portions can co-operate to define a circular hole which receives the plug 8. The effect of the plug is to urge the blocks in the columns it engages outwards, away from the axis of the group, so that the peripheral faces $y$ of that column are pressed into engagement with the peripheral faces $z$ of the columns of neighbouring groups. At the same time those flanks of the columns which lie in planes which intercept a plug 8 are relieved with a generous clearance C which is fixed by the insertion of the plug without actually entering the clearance itself.

Bounding the core is a peripheral member 10 and this comprises a steel liner 11 backed by a row of vertical R.S.J's 12 one flange of which bears on the outer side of the liner 11 and the other flange bears against rollers 13 mounted in a row of spacers 14. The spacers 14 have further rollers 15 which abut the pressure vessel wall 16. The liner is thus restricted against movement radially of the core and thus restricts like movements of the core columns 1. Between the liner 11 and the outermost groups of columns in the core are the usual, specially shaped, row of graphite reflector blocks 17.

Between the closely engaging peripheral surfaces of adjacent groups of columns are located on a square lattice control rod thimbles 18 and there each take a share of the reaction of the force which the clearance fixing plugs extend on the columns of adjacent groups.

Figure 4:
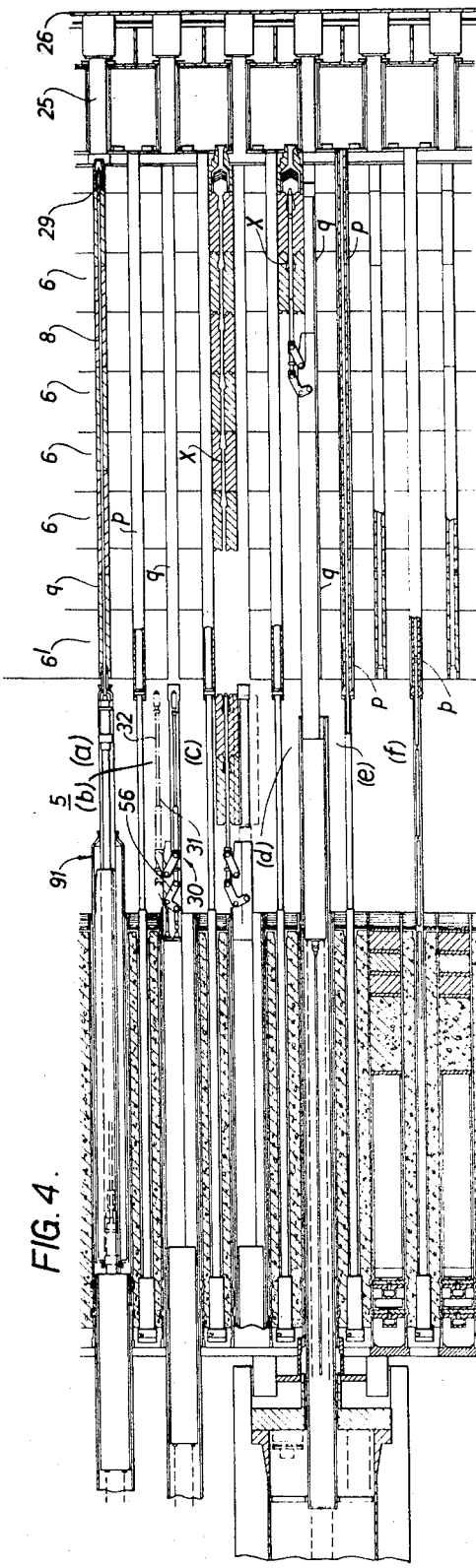
FIG. 4 is a composite view of the core showing succesive stages in a fuel replacement operation.

Referring again to FIGS. 1 and 4, a pressure container 20 housing a refuelling machine is supported above the top cap of the pressure vessel on a gantry moveable on rails 21 spanning the reactor top cap which rails are themselves slidable on a fixed pair of rails 22. The operational sequence in the core will be described and FIG. 4 is useful for this purpose, illustrating the operations $a$–$f$. In FIG. 4 the columns of fuel containing blocks 6 are supported on stools 25 which space the base of the columns from the floor 26 of the vessel. The uppermost block $6^1$ of each column is an unfuelled graphite reflector block and above this, a space which is a coolant inlet plenum 5 separates the core from the top slab of the pressure vessel. The top slab penetrations are immediately above holes $q$ at the centre of the block cluster which holes are occupied by the tubular plugs 8. Now the effect of the plugs 8 is to force apart the blocks of the adjacent cluster so as to take up the slack and fix the working clearance C purposely provided for recharging operations. To remove a particular plug, a lifting rod assembly 29 is lowered by the charge machine into the bore of the tubular plug 8 as shown in operation (a). At the base of the bore, the rod assembly is latched to the plug and the latter is pulled straight out by a direct lift.

Having established the necessary working clearance by the removal of the plug, the plug is parked, complete with its handling equipment in the charge machine vessel 20. The charge machine then introduces into the plenum, the fuel block handling column 30 which, in operation (a), held and manipulated the plug lifting rod assembly 29. The lower end of the column comprises a tube 31 slotted along one side. This tube acts as a keeper and is termed a keeper tube. Once in the plenum, within the space which is available there, a fuel block lifting rod 32 is moved outwardly parallel with itself from within the keeper tube 31 by the bell crank lever system 56 shown. By this movement, the fuel block lifting rod 32 is aligned vertically above the central hole $x$ in an adjacent fuel block. Both the keeper tube 31 and the fuel block lifting rod 32 are then lowered together, the keeper entering with clearance, the hole $q$ vacated by the plug 8 and the fuel block lifting rod entering the hole $x$ in the centre of the adjacent fuel block.

The fuel block lifting rod 32 is passed through the top reflector block $6^1$ and latches into the base of the top fuel block 6. These two blocks are then raised clear of the core as shown at $c$ (FIG. 4) being guided on one side by the adjacent control rod tube and on the other by the keeper tube. The keeper tube is raised and the fuel blocks are swung inwards on the centre line of the penetration. The two blocks can now be lifted directly through the penetration into the charge machine pressure vessel 20.

The operation (c) is repeated and successive lower blocks unloaded. At (d) the operation of unloading the lower-most pair of blocks of a column is shown.

A fresh column of fuel blocks can be easily built up by reversing the sequence of operations (a)–(c). The final operation is that of replacing the tubular plug 8 which spreads the blocks of the four adjacent columns and so takes up the clearances between the flanks of adjacent blocks.

At (e) and (f) respectively the control rod is shown at its two, upper and lower limiting positions of movement.

Figures 5, 6:
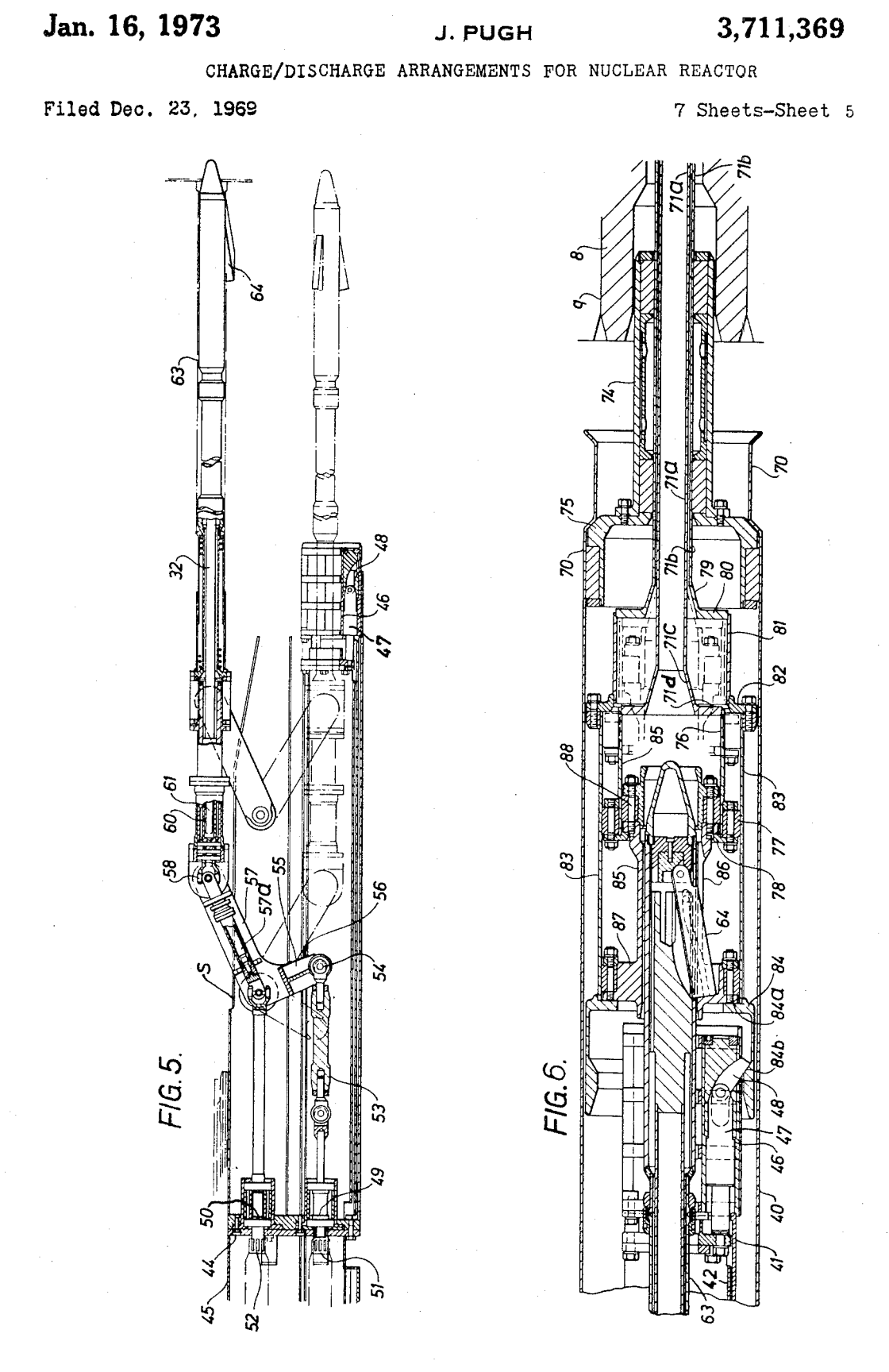

The charge column as shown in FIG. 6 comprises a series of three coaxial tubes 40, 41, 42. At their upper ends the outer tube 40 is attached to a closure plate 44 whilst the inner two tubes 41, 42 are movable axially with respect to the plate. The whole assembly may be lowered or raised as a unit by moving a support tube 45 welded to the plate 44 by a winch in the charge machine vessel. At its lower end, the outer tube carries three cylinders 46 (one of which is shown in FIG. 4) in which is slidable a piston 47. A gripper 48 is pivoted on the piston which is shaped to co-operate with a cam groove in the piston so that when the piston is advanced the gripper protrudes through the tube 46. The piston is advanced and contracted by moving the inner tube 42 axially to cause the grippers to protrude from or be withdrawn through the slots in the head of the cylinder. The inner tube, with grippers extended, may be raised or lowered by moving the middle tube.

The closure plate 44 carries on its lower side two sets of bearings 49, 50 which support separate drive shafts 51, 52. The latter extend down from actuators (not shown) located in the upper part of the charge column. The drive shaft 51 passes through a hole in the closure plate into the bearing 49 where it drives through a screw and nut connection a link 53, the other end of which is connected through knuckle joint 54 to one arm 55 of a bell crank 56 of which the other arm is designated 57.

The second drive shaft 52 also extends through a hole in the closure plate 44 and through the bearings 50 where its extremity provides at a position coincident with the fulcrum of the bell crank 56, a rotary drive for a second shaft 57a extending within the second arm 57. The shaft 57a terminates in a constant velocity joint 58 coincident with the free end of the arm 57 and is drivingly connected through the joint 58 to drive the nut portion of a nut and screw drive 60 to impart axial motion to a dependent rod 32 extending within a tube 63 and coupled to the fuel block gripping device.

As indicated in FIG. 5 the bell crank 56 can be rocked between the dotted line position shown or the full line position by rotation of the shaft 51 and axial movement of link 53, whilst the rotary drive in arm 57 can be rotated to rotate the nut of the drive 60 at any position of the bell crank. At the lower end of the tube 63 are pivoted fingers 64 and at the adjacent end of the rod 32 carried pins which engage in cam slots in the fingers. These slots are so shaped that in response to axial movement of the rod 32 the fingers 64 are caused to expand or retract through slots in the tube wall.

It will be understood that the parts described so far are suitable for handling by remote control, a fuel block by entering a hole $x$ in any one of a group of blocks offset from the centre of the charge column, the whole assembly being lowered down by winches in the charge machine pressure vessel, the charge column is then rotated to align the slots in the outer tube 40 with the radial direction of the required fuel block. The bell crank is then extended by exerting an axial force on link 53 so as to line up the dependent shaft with the hole $x$ in the underlying fuel block. The dependent shaft together with the keeper tube is lowered until the latter enters the hole vacated by a plug tube. The fingers 64 are then expanded to engage in the corresponding slots formed in the wall of the hole $x$ in the block to be lifted. As the blocks are raised into the plenum 5, the keeper tube in the plug tube hole restrains unwanted movement of the adjacent blocks and stops them from falling inwards. Once within the plenum, the keeper tube is raised to a level above the blocks and the bell crank is again rocked to bring the dependent shaft and its fuel blocks into alignment with the axis of the tube 40 and hence into alignment with the standpipe in the top cap of the pressure vessel 1. The fuel blocks can then be raised up into the charge machine pressure vessel 22.

It should be noted that before the fuel block handling operation, it is first necessary to create the necessary clearances between fuel blocks and this is done by removing a plug 8 adjacent the requisite column of blocks. This operation, together with the equipment needed for it will now be described.

The equipment required comprises a grapple similar to that shown in FIG. 6 operable by effecting relative movement between coaxial tubes 71a, 71b, and coupling devices to enable this relative movement on the one hand and a straight lift on the other to be transmitted by manipulation of the grippers 48 and the fingers 64 respectively. These parts are located within a guide tube 70 which in use is located against a shoulder in the penetration and extends downwardly to stop short of the upper face of the core.

Figure 7A:
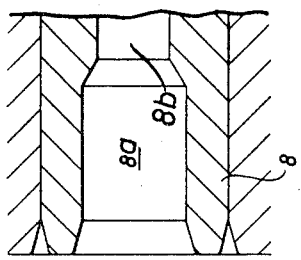
FIGS. 7A, 7B, 7C indicate the interaction between the plug and its lifting gear.
Figure 7A:
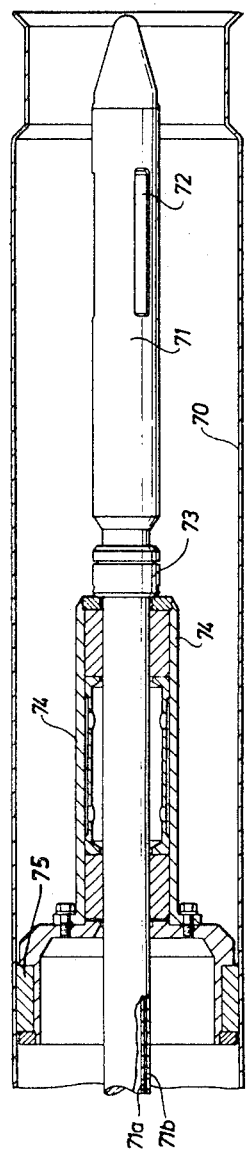
Figure 7B:
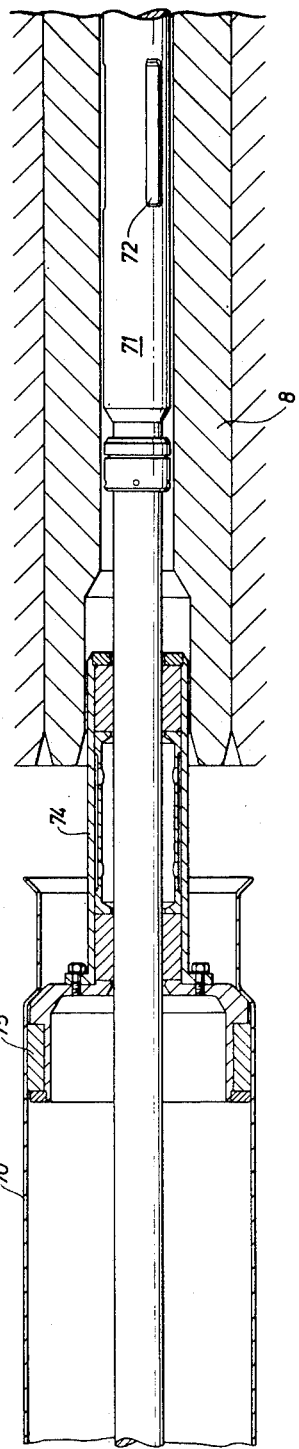
Figure 7C:
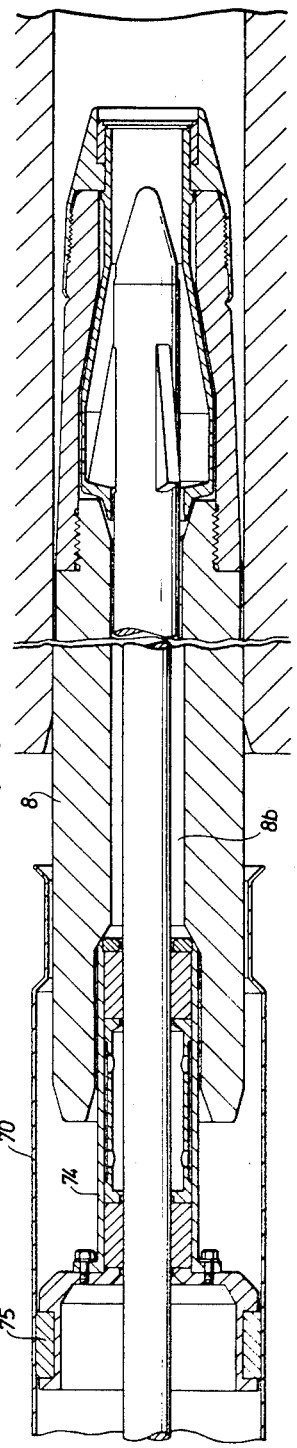

The lower end of this plug removal equipment is shown in FIGS. 7A, 7B, and 7C whilst in coupling engagement with the fuel block lifting assembly as shown in FIG. 6. As shown, this part of the equipment comprises a dependent inner guide tube 70 concentrically within which extends coaxial plug lifting tubes 71a, 71b having a shaped nose piece. The plug grippers 72 are arranged exactly as the fuel block fingers 64 and expanded or retracted by axial movement between tubes 71a, 71b. Thus the grippers, one only of which are shown at 72, are pivoted on the outer tube 71b and arranged so that they will retract or protrude through slots in the outer tube 71b by applying axial movement to the inner tube 71a. Above the grippers 72, the tube 71b has a collar 73 which limits the downward travel of a floating guide 74 which has a portion 75, of enlarged diameter so as to be a sliding fit within the guide tube 70. As mentioned above the tube 70 is supported on a shoulder in the penetration. The smaller diameter position of the guide 74 is, as shown in FIG. 6 a sliding fit in a bell-mouthed portion protion 8a at the top of the plug bore 8b.

As also shown in FIG. 6, the tube 71a extends into a conical portion 71c to a flange 71d welded annularly to one end of a tube 76 of larger diameter. The other end of the tube 76 carries a collar offering an outer cylindrical bearing surface 77 and a re-entrant lip 78.

The outer tube 71b also extends upwardly into a conical portion 79 and a larger diameter flange 80 which carries one end of a tube 81 whose inner diameter is slightly greater than the outer diameter of the tube 76. The upper end of the tube 81 is welded to a flange 82 giving a further stepped increase in diameter which carries, in turn, a tube 83 whose inner diameter is just large enough to receive the bearing surface 77 as a sliding fit. The other end of the tube 83 is welded to a bell-mouthed collar 84 which provides an inner shoulder 84a to the tube 84 and an extension to the tube 84 being undercut to form an annular recess 84b.

Within the tube 83 is mounted a gravity operated centre tube 85 which is a tube of a diameter slightly larger than the external diameter of the fuel block lifting rod nose-piece and has slots 86 for reception, on occasion, of the fuel block lifting rod grippers 64. The centre tube has, at its upper end, a flange 87 which carries a bearing surface which slides over the inner face of the tube 83, its upward travel being limited by the internal shoulder 84a and carried at its lower end a collar 88 with a bearing surface which slides in the bore of the tube 76 forming an extension of the inner tube 71a.

In operation, the plug lifting assembly is picked up in the charge machine pressure vessel by allowing the nosepiece on the tube 63 to enter the gravity operated centre tube and expanding the fingers 64 into the slots 86. Simultaneously the lower end of the restrainer tube 41 enters the bell-mouthed collar 84 and the grippers 48 expanded into the recess 84b.

The plug lifting assembly is then raised up from its parking position in the charge machine and lowered with the inner guide tube through the pressure vessel standpipe into the coolant plenum.

The lower rim of the inner guide tube 70 stops short of the face of the core blocks 6 as an external shoulder on the outer guide tube 91 FIG. 4 welded to the tube 70 comes into engagement with an internal shoulder in the bore of the standpipe. The lifting tubes 71a, 71b are lowered through the guide tube to enter the bore of the plug 8. To allow the tubes to enter the bore the grippers must be retracted and this is done by raising the rod 29 by lifting the gravity tube 76 through the tube 83. The floating guide 74 is carried with the tube 71b and its small diameter portion enters the bell-mouthed portion 8a in which it is a sliding fit whilst its larger diameter portion steadies the assembly by its engagement with the base of the inner guide tube. When the grippers come adjacent recesses in the bore of the plug they are expanded by lowering inner tube 71a relative to the outer tube. Both the grippers 48, 64 are then raised together.

The plug lifting rod is then raised lifting the plug upwards into the inner guide tube whence it can be lifted directly upwards out of the core pressure vessel.

In an alternative arrangement the keeper may be a member separate from the charge machine but handled by that machine as shown in FIGS. 8 and 9. After the spreader plug has been removed from the core by a vertical lift, the machine is then operated to position a keeper 80 shown in FIGS. 8 and 9 in the hole vacated by the plug. The keeper 80 comprises a short hollow spike 81 with an internal shoulder 82 of a form so that it can be engaged by the latches 72 of the grapple. The spike carries a radial arm 83 to the end of which is welded an arcuate piece 84 which is a short length of tube with a portion of the wall, remote from the radius arm, removed. The length of the radial arm 83 is such that when the spike 81 is inserted into the central hole x in an adjacent core component, the arcuate piece 84 slides into the hole vacated by the spreader plug. The arcuate piece 84 of the keeper thus serves to hold back the three adjacent fuel columns say 6', 6" and 6''' which border the spreader plug hole 7a and allow a block from the fourth column 6'''' to be lifted up without fear of the other adjacent blocks toppling. The lower part 63 of the tube and its inner rod 32 is inserted into the central hole x in the unrestrained fuel block 6'''' which is lifted vertically clear of the core.

We claim:

1. A gas cooled nuclear reactor core comprising a number of columns, each of a plurality of vertically superimposed prismatic blocks of moderator material which bears the nuclear fuel in which the columns are free standing with respect to each other, are in side by side adjacency with respect to each other and are arranged in a plurality of groups, a withdrawable longitudinal plug provided at the centre of each group and engaging each of the columns of that group, the plug being of sufficiently large cross-section relative to the cross-section of the columns that the plugs exert an outward force on each of the columns in its group providing, in the cold condition of the core, a clearance between the sides of the columns within that group which face each other and a substantial abutment between the sides of the columns facing the neighbouring groups and the opposed facing sides of the columns of the said neighbouring groups.

2. A nuclear reactor as claimed in claim 1, including a keeping means for keeping in position the blocks in columns adjacent to a column from which blocks are being removed after the appropriate longitudinal plug has been removed.

3. A nuclear reactor as claimed in claim 2, including a charge machine operable above the core for manipulating core blocks, the machine including a casing from which a block gripping device is extensible to engage a block to be removed, the casing constituting said keeping means and keeping in their positions core blocks in columns adjacent to that column containing the block engaged by the block gripping device.

4. A nuclear reactor as claimed in claim 3, including a piece part, means for introducing said piece part into the reactor vessel, and said piece part being manipulable by the charge machine to be located in a position in the core to serve as said keeping means to keep in their situation in the core those blocks which are in columns adjacent to that column containing the block engaged by the block gripping device.

5. A nuclear reactor according to claim 3, wherein each of said blocks has a central aperture engageable by said block gripping device for lifting that block, a block handling means adjacent the core and controlled remotely for manipulating the gripping device such that it engages said aperture, a number of longitudinal control rods inserted in the core between said groups of columns.

6. A nuclear reactor as claimed in claim 1, wherein each of said columns is pentagonal in cross-section.

7. A nuclear reactor having a core structure composed of a number of free standing columns disposed side by side to form a substantially contiguous core and each column comprising at least one fuel bearing block, a peripheral member bounding the core;
  (i) the columns being arranged in a number of groups;
  (ii) the blocks of each group being disposed about a common axis extending centrally of the group and parallel to the side faces of the columns;
  (iii) a clearance fixing plug disposed on said axis of at least some of said groups and engaging a portion of the outer surface of each of the columns in that group;
  (iv) the mutually adjacent side faces of the blocks of the groups of columns being spaced apart by a fixed clearance, and
  (v) the side faces of the block of the group of columns peripherally of said group abutting those of the adjacent groups.

References Cited

UNITED STATES PATENTS

| | | | |
|---|---|---|---|
| 3,206,370 | 9/1965 | Campbell et al. | 176—58 X |
| 3,212,987 | 10/1965 | Mason | 176—43 X |
| 3,172,820 | 3/1965 | Lenngren et al. | 176—67 X |
| 3,413,196 | 11/1968 | Fortescue et al. | 176—58 X |
| 3,125,760 | 3/1964 | Foster et al. | 176—30 X |
| 3,440,139 | 4/1969 | Lapierre | 176—30 |

FOREIGN PATENTS

| | | | |
|---|---|---|---|
| 1,527,490 | 4/1968 | France | 176—30 |

CARL D. QUARFORTH, Primary Examiner

E. E. LEHMANN, Assistant Examiner

U.S. Cl. X.R.

176—58, 84, 87